United States Patent [19]

Shiraki et al.

[11] Patent Number: 5,376,461
[45] Date of Patent: Dec. 27, 1994

[54] PAD FOR AIR BAG APPARATUS

[75] Inventors: Kouji Shiraki; Yasuji Ozaki; Tsugunori Sugiura; Tadashi Yamamoto; Hiroshi Ogawa; Takanobu Ikeda, all of Aichi, Japan

[73] Assignee: Toyoda Gosei Co., Ltd., Nishikasugai, Japan

[21] Appl. No.: 35,571

[22] Filed: Mar. 23, 1993

[30] Foreign Application Priority Data

Apr. 8, 1992 [JP] Japan .................. 4-086971

[51] Int. Cl.$^5$ .............. B29D 22/00; B65D 65/28; B32B 7/02; B32B 27/08
[52] U.S. Cl. .................. 428/35.2; 428/483; 428/136; 428/172; 428/519; 428/424.2; 428/424.8; 280/731
[58] Field of Search .......... 428/35.2, 43, 35.4, 428/217, 516, 517, 519; 280/731

[56] References Cited

U.S. PATENT DOCUMENTS 5,110,647  5/1992  Sawada et al. .................. 428/43
5,248,532  9/1993  Sawada et al. .................. 428/35.2

FOREIGN PATENT DOCUMENTS 3189252  8/1991  Japan .

Primary Examiner—George F. Lesmes
Assistant Examiner—Kathryne E. Shelborne
Attorney, Agent, or Firm—Cushman, Darby & Cushman

[57] ABSTRACT

A pad of air bag apparatus which, as a molded part, has an enhanced soft touch and which is protected against accelerated time-dependent changes in the physical properties of the pad's core and skin layers, wherein the pad covers the upper surface of an air bag apparatus which is to be mounted on the steering wheel of an automobile or in any other necessary areas. The pad includes of a skin layer formed of a soft first resin material and a core layer formed of a second resin material harder than the first resin material. The first resin material is a styrenic thermoplastic elastomer (TPE) or olefinic TPE having a hardness (JIS A) of 70 and less whereas the second resin material is a polyester based TPE having a flexural modulus of 1,000–4,000 kgf/cm$^2$ (98–392 MPa) or a polyurethane based TPE having a flexural modulus of 1,000–2,500 kgf/cm$^2$ (98–245 MPa).

20 Claims, 1 Drawing Sheet

PAD FOR AIR BAG APPARATUS

BACKGROUND OF THE INVENTION

The present invention relates to a pad that covers the upper face of an air bag apparatus which is to be mounted on the steering wheel of an automobile or on the instrument panel in front of the seat next to the driver's. More particularly, the present invention relates to a pad for air bag apparatus that is an integral molding of a skin and a core layer and which hence can be manufactured with high production rate.

DESCRIPTION OF RELATED ART

Previous pads for air bag apparatus have generally been produced from a foamable polyurethane formulation for reactive injection molding (RIM), with a net insert being embedded to serve as reinforcement for the upper wall of the pad when the air bag is actuated. This method, however, has had several problems, among which the following two are important: (1) since the net insert is used, an extra job for setting up the insert is necessary, thus increasing the number of process steps involved; and (2) the polyurethane formulation to be used in RIM is thermosetting and unsuitable for recycling.

As an example of the prior art, Unexamined Published Japanese Patent Application No. 189252/1988 proposed a pad (indicated by 5 in FIG. 1) which is an integral molding of a skin layer 1 formed of a soft first resin material, styrenic thermoplastic elastomer) (styrenic TPE) and a core layer 3 formed of a second resin material (olefinic resin) harder than the first resin material. An air bag 7 is mounted above the boss (not shown) of the steering wheel and it has an inflator 9 fitted thereon. The pad 5 is secured to the inflator 9, with a retainer 11 interposed, by means of rivet 13 or the like. Shown by 15 is a notched groove (weak portion for expansion) that permits the pad to expand easily when the air bag is actuated.

The core layer of the pad having the structure described above is formed of a resin material that has an ethylenic rubber blended with a hard polyolefin which has inherently high rigidity; in other words, the core layer is made of a blend type olefinic TPE which is weak except for a cross-linked type. Hence, in order to develop strength, it is generally required to adopt a material design providing high rigidity. For example, in all examples described in the Japanese Patent Application, No. 189252/1988, the flexural modulus obtained was 3,900 kgf/cm$^2$ (382 MPa) and above, even if the skin was made of a soft TPE having JIS A hardness of 43-61 as in the cited examples. Thus, the skin in the cited examples is subject to the influence of the relatively hard core layer having high flexural modulus, thus failing to provide a soft touch.

As a result of continued studies on the prior art, the present inventors found that both the core and skin layers would undergo accelerated changes in physical properties over time. The change in the physical properties of the core layer is particularly undesirable since it involves a change in strength. This is because the hydrocarbon based softening agent usually contained in the styrenic TPE material of which the skin layer 1 is formed will gradually migrate into the core layer 3 formed of an olefinic resin. In other words, the softening agent and the core forming resin are both a nonpolar material and have solubility parameter values close to each other.

SUMMARY OF THE INVENTION

The present invention has overcome the above mentioned problems in the prior art and has as an objective a new and novel pad for air bag apparatus which, has a molded part, has an enhanced soft touch and has protection against accelerated time-dependent changes in the physical properties of the core and skin layers.

The above-stated objective of the present invention has been attained by both of the following pads for an air bag apparatus:

(1) The pad which covers the upper surface of an air bag apparatus and which is an integral molding of a skin layer formed of a soft first resin material and a core layer formed of a second resin material harder than the first resin material, said core layer having a weak portion for expansion that permits the pad to expand easily when the air bag is actuated, wherein the first resin material is a styrenic thermoplastic elastomer (TPE) or olefinic TPE having a hardness (JIS A) of 70 and below, and the second resin material is a polyester based TPE having a flexural modulus of 1,000–4,000 kgf/cm$^2$ (98–392 MPa); and (2) The pad, which covers the upper surface of an air bag apparatus and which is in integral molding of a skin layer formed of a soft first resin material and a core layer formed of a second resin material harder than the first resin material, said core layer having a weak portion for expansion that permits the pad to expand easily when the air bag is actuated, wherein the first resin material is a styrenic TPE or olefinic TPE having a hardness (JIS A) of 70 and below, and the second resin material is a polyurethane based TPE having a flexural modulus of 1,000–2,500 kgf/cm$^2$ (98–245 MPa).

DETAILED DESCRIPTION OF THE INVENTION

Figure 1:
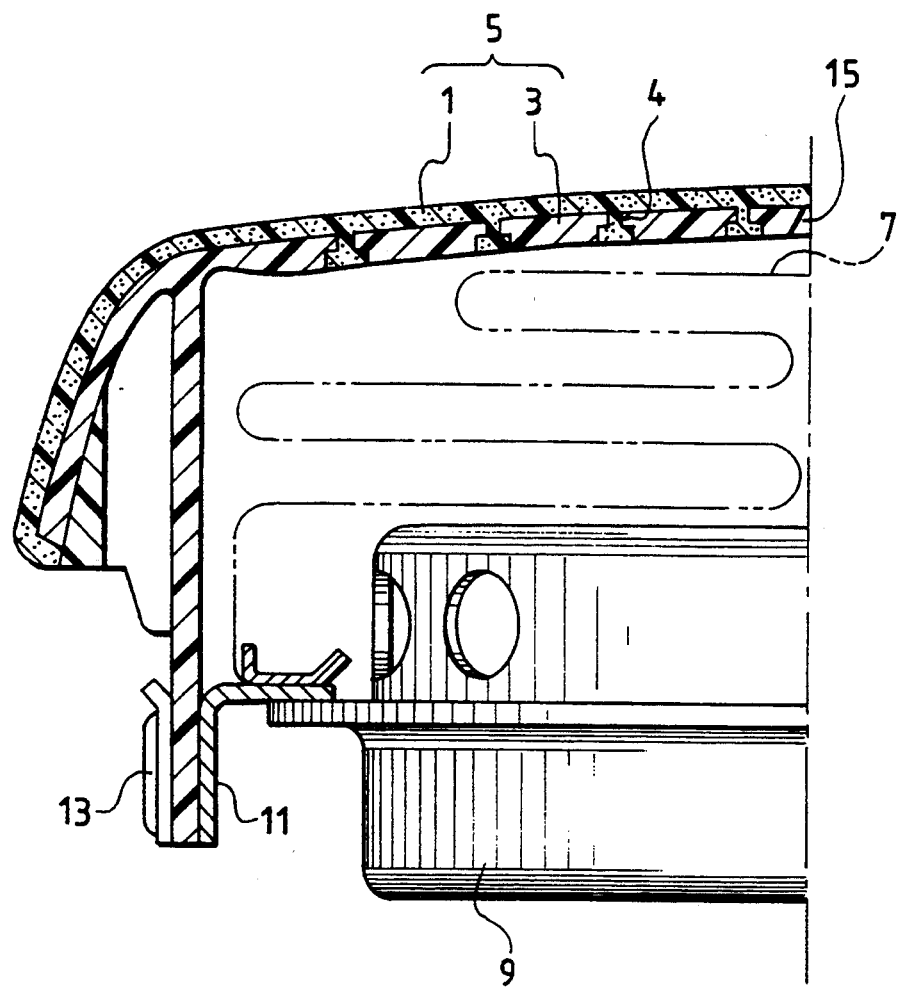
FIG. 1 illustrates a longitudinal section of the left half of a pad as it is attached to an air bag apparatus according to an embodiment of the present invention.

Preferred embodiments of the present invention are described below with reference to the accompanying drawing.

The discussion is first directed to the basic construction of the invention, such that the components already described above will not be further explained in detail.

The pad 5 for air bag apparatus is an integral molding of a surface layer 1 which is formed of a soft first resin material and a core layer 3 which is formed of a second resin material harder than the first resin material. The core layer 3 has a weak portion 15 for expansion that permits the pad to expand easily when the air bag is actuated. In the embodiment illustrated, the weak portion is formed as a thin-walled portion during molding but this is not the sole manner for accomplishing the invention and the weak portion may assume any other forms such as perforations, slits, etc.

The skin layer 1 has typically a thickness of 1-6 mm and the core layer 3 has typically a thickness of 1-6 mm. In order to insure positive binding between the skin layer 1 and the core layer 3, the upper wall of the core layer 3 is interspersed with a plurality of binding holes 4, although this is not an essential feature.

Further defining the construction described above, the first resin material is a styrenic TPE or olefinic TPE having a hardness (JIS A) of 70 and below and the second resin material is a polyester based TPE having a flexural modulus of 1,000–4,000 kgf/cm$^2$ (98–392 MPa) or a polyurethane based TPE having a flexural modulus of 1,000–2,500 kgf/cm$^2$ (98–245 MPa).

If the hardness (JIS A) of the first resin material exceeds 70, it becomes difficult to impart desired soft touch to the molded part. If the flexural modulus of the second resin material is less than 1,000 kgf/cm$^2$ (98 MPa), it becomes difficult to impart shape retaining ability to the core layer 3. If the flexural modulus exceeds 4,000 kgf/cm$^2$ (392 MPa) in the case of polyester based TPE or 2,500 kgf/cm$^2$ (245 MPa) in the case of polyurethane based TPE, it not only becomes difficult to impart an enhanced soft touch to the molded part, as will be shown later in the test example, but there is also a high likelihood that a problem is encountered with the expandability of the pad when the air bag is actuated. The upper limit of the flexural modulus of the polyurethane based TPE is set to be higher than that of the polyester based TPE since the former has great temperature dependency and will experience significant variations in flexural modulus depending on use conditions.

The skin layer is formed of the styrenic or olefinic TPE because they have specific gravities less than 1.0, which are smaller than those of other TPEs (thus contributing to lighter weight), and because they have comparatively satisfactory weathering properties. In order to have hardness of not more than 70 on the JIS A scale, those TPE resins usually contain a process oil or other softening agents in amounts of 10–20% of the compound. The softening agents may be a hydrocarbon based softening agent. If the styrenic TPE is not a dynamic vulcanized type without partial cross-linking, some problem will arise in terms of light fastness and wear resistance and, hence, it is desirable to paint the surface of the skin layer 1 with coatings that enhance light fastness and wear resistance. The coatings are conducted in accordance with a conventional method which is described in, for example, a Japanese Patent Unexamined Publication No. 190529/1986 and a Japanese Patent Unexamined Publication No. 192743/1986.

The core layer is formed of the polyester or polyurethane based TPE for the following three reasons. First, among various TPEs available, the polyester and polyurethane based TPEs achieve the strength (in particular, tensile and tear strength) required for the core layer even if the flexural modulus is low. Secondly, those TPEs have softening points of at least 100° C. which will easily impart shape retaining ability at high temperature. Thirdly, they are polar materials and will not accelerate the migration of hydrocarbon based softening agents (which are nonpolar materials) from the skin layer. Olefinic and polyamide based TPEs also have softening points not lower than 100° C.; however, it is not easy for these TPEs to impart the necessary strength at comparatively low levels of flexural modulus and, in addition, the olefinic TPE has a tendency to accelerate the migration of nonpolar softening agents for the reason already stated in connection with the prior art.

The styrenic TPE useful as the constituent material of the skin layer may be selected from among various types such as styrene butadiene styrene (SBS), styrene isoprene styrene (SIS) and styrene ethylene butadiene styrene (SEBS) in which the soft segment is polybutadiene, polyisoprene and polyolefin, respectively. Among these styrenic TPEs, SEBS is particularly preferred since it does not have double bonds between molecules and because it is satisfactory in such aspects as weathering, wear resistance and heat resistance. To give specific examples, "Rabalon SJ5400B (hardness, 55)" and "Rabalon SJ6400B (Hardness, 65)" (both manufactured by Mitsubishi Petrochemical Co., Ltd.) and "Kraton G1657 (hardness, 65)" (manufactured by Shell Chemical Co.) are useful.

The olefinic TPE also useful as the constituent material of the skin layer may be selected from among various types including a blend type, a polymer type, as well as the products of their partial cross-linking with organic peroxides, and a dynamic vulcanized type which has the rubber phase crosslinked completely during mixing. Among these olefinic TPEs, a dynamic vulcanized type which is satisfactory in terms of resistance to heat and wear is desirable. To give specific examples, "Milastomer 5030N (hardness, 50)" (product of Mitsui Petrochemical Industries, Ltd.) and "Thermorun 3550B (hardness, 60)" (product of Mitsubishi Petrochemical Co., Ltd.) are useful.

The polyester based TPE useful as the constituent material of the core layer may be selected from among (i) a polyester-polyether type in which the hard segment is a polyester such as polybutylene terephthalate whereas the soft segment is a polyether such as polytetramethylene glycol ether (PTMG) or PTMEGT (a condensate between PTMG and terephthalic acid), and (ii) a polyester-polyester type in which the hard segment is the same polyester as in (i) whereas the soft segment is an aliphatic polyester such as polycaprolactone. Among these polyester based TPEs, a polyester-polyester type in which the hard segment is polycaprolactone is satisfactory in terms of resistance to thermal aging and weathering and, hence, is desirable. To give specific examples, "Hytrel 5557" and "Hytrel 5577" (products of Toray-Du Pont Co., Ltd.) and "Pelprene S-2001" and "Pelprene S-3001" are useful.

The polyurethane based TPE also useful as the constituent material of the core layer may be selected from among those which are based on (i) caprolactone, (ii) adipate, (iii) polycarbonate, and (iv) polyether, as classified in accordance with the long-chain polyol used. Among these polyurethane based TPEs, one which is based on caprolactone is desirable since it has high mechanical strength and attains good balance between resistance to thermal aging and cold resistance. To give specific examples, "Pandex T-5070" and "Pandex T-59650" (manufactured by Dainippon Ink & Chemicals, Inc.) and "Elastollan E-5747FNAT" (product of Nippon Elastollan Industries, Ltd.). These polyurethane based materials have flexural module typically higher than 2,500 kgf/cm$^2$ (245 MPa) and, hence, it is recommended that a plasticizer be incorporated in those resins to adjust their flexural modulus to the specified value and below.

The process for producing the pad of the present invention is not limited in any particular way but a typical method may proceed as follows. First, the core layer 3 is formed by injection molding a compound formulated from the polyester or polyurethane based TPE described in preceding paragraphs. In the next step, with the core layer 3 being set in a mold, the skin layer 1 is formed by injection molding a compound formulated from the styrenic or olefinic TPE while, at the same time, the two layers are combined to form an integral assembly. If necessary, an adhesive may be applied to the surface of the core layer 3.

ADVANTAGES OF THE INVENTION

Constructed in the manner described above, the pad for air bag apparatus of the present invention offers the following advantages:

(i) The skin layer is formed of a TPE material having a hardness (JIS A) not higher than 70, whereas the core layer is formed of a TPE material having a flexural modulus of 1,000–4,000 kgf/cm² (98–392 MPa) or 1,000–2,500 kgf/cm² (98–245 MPa) and this contributes an enhanced soft touch to the pad;

(ii) Since the core layer is formed of a polyester or polyurethane based TPE which are both a polar material, the molding material for the skin layer may contain a process oil and other hydrocarbon based softening agents as in the prior art and, yet, there will be no accelerated migration into the core layer of the softening agent which is a nonpolar material, therefore removing the possibility of accelerated changes in the physical properties of the core and skin layers; and (iii) The core layer, which has a flexural modulus of no more than 4,000 kgf/cm² (98 MPa) in the case of a polyester based TPE or no more than 2,500 kgf/cm² (245 MPa) in the case of polyurethane based TPE, insures that the pad will expand satisfactorily when the air bag is actuated (see the test example that immediately follows).

Test Example

The following test was conducted in order to verify the novel and heretofore not taught achievements of the present invention.

Pads of Examples 1 to 6 of the present invention and those of Comparative Examples 1 and 2 were molded from the combinations of materials listed in Table 1. Each pad 5 had the following specifications: the area of the upper wall was 28 cm²; core layer 3 had an average upperwall thickness of 2.8 mm, had binding holes and weak portions for expansion in the upper wall as illustrated, and had an adhesive (chlorinated polyolefin based) applied to its surface; and skin layer 1 had an average upperwall thickness of 2.2 mm.

Each pad was attached to an air bag apparatus of the same type as mounted on a commercial automobile and subjected to an inflation test at the temperatures listed in Table 1. The manner in which the pads expanded was checked visually and evaluated by the following criteria: O, expanded smoothly; Δ, cracks developed in part of the pad; x, the pad burst out. The results are shown in Table 1. Obviously, the pads of Examples 1 to 6 had no problem in the three aspects under test: expansion at 85° C.; expansion at −35° C.; expansion after thermal aging. However, the pads of Comparative Examples 1 and 2 had problems in the aspect of expansion both at 85° C. and at −35° C.

The data on the physical properties of the resin materials used were picked out or calculated by conversion from the tables in the Data Books published by the manufacturers of those materials, except that data for "Pandex 5070" used as the constituent material of the core layer in Example 5 and Comparative Example 2 were measured in accordance with the methods described in those Data Books. The test methods employed were as follows: (1) tensile strength: ASTM D 638; (2) flexural modulus: ASTM D 790; (3) Izod impact strength: ASTM D 256; (4) surface hardness: JIS K 6301.

TABLE 1

| | Example | | | | | | Comparative Example | |
|---|---|---|---|---|---|---|---|---|
| | 1 | 2 | 3 | 4 | 5 | 6 | 1 | 2 |
| Core layer | | | | | | | | |
| Type of elastomer | polyester base | polyester base | polyester base | polyester base | polyurethane base | polyurethane base | polyester base | polyurethane base |
| Trade name | Hytrel 5557 | Hytrel 5557 | Hytrel 5557 | Pelprene S-2001 | Pandex T-5070* | Pandex T-5070* | Pelprene S-6001 | Pandex T-5070* |
| Tensile strength (kgf/cm²) (MPa) | 320 (31.4) | | | 370 (36.3) | 450 (44.1) | 450 (44.1) | 450 (36.3) | 500 (49.0) |
| Flexural modulus (kgf/cm²) (MPa) | 2,140 (209.7) | | | 1,900 (186.2) | 2,000 (196.0) | 2,000 (196.0) | 5,800 (568.4) | 3,500 (392.0) |
| Izod impact value (−20° C. with notch) | NB | | | NB | NB | NB | 15 kg·cm/cm | NB |
| Skin layer | | | | | | | | |
| Type of elastomer | styrenic | olefinic | olefinic | styrenic | styrenic | olefinic | olefinic | olefinic |
| Trade name | Rabalon SJ5400 | Milastomer 5030N | Thermorun 3550B | Rabalon SJ5400 | Rabalon SJ5400 | Milastomer 5030N | Milastomer 5030N | Milastomer 5030N |
| Hardness (JIS A) JIS K 6301 | 55 | 50 | 60 | 55 | 55 | 50 | 50 | 50 |
| Inflation test | | | | | | | | |
| at 85° C. | o | o | o | o | o | o | Δ | Δ |
| at −35° C. | o | o | o | o | o | o | x | x |
| at normal temp. after thermal aging (105° C. × 400 h) | o | o | o | o | o | o | — | — |

What is claimed is:

1. A pad for covering the upper surface of an air bag apparatus and which is formed by an integral molding, comprising:
    a skin layer formed of a soft first resin material; and
    a core layer formed of a second resin material harder than said first resin material, said core layer having a weak portion for expansion that permits the pad to expand easily when the air bag is actuated, said first resin material being selected from the group consisting of a styrenic thermoplastic elastomer (TPE) and olefinic TPE having a hardness (JIS A) of 70 and below, and said second resin material being a polyester based TPE having a flexural modulus of 1,000–4,000 kgf/cm$^2$ (98–392 MPa).

2. A pad according to claim 1, wherein said skin layer is formed of a TPE resin which contains a hydrocarbon based softening agent.

3. A pad according to claim 1, wherein said skin layer is formed of TPE resin which contains a hydrocarbon based softening agent in amounts of 10–20% of the compound.

4. A pad for covering the upper surface of an air bag apparatus which is formed by an integral molding, comprising:

a skin layer formed of a first soft resin material; and a core layer formed of a second resin material harder than said first resin material, said core layer having a weak portion for expansion that permits the bag to expand easily when the air bag is actuated, said first resin material being selected from the group consisting of a styrenic TPE and olefinic TPE having a hardness (JIS A) of 70 and below, and said second resin material being a polyurethane based TPE having a flexural modulus of 1,000–2,500 kgf/cm$^2$ (98–245 MPa).

5. A pad according to claim 2, wherein said skin layer is formed of TPE resin which contains a hydrocarbon based softening agent.

6. A pad according to claim 2, wherein said skin layer is formed of TPE resin which contains a hydrocarbon based softening agent in amounts of 10–20% of the compound.

7. A pad according to claim 1, wherein said styrene TPE is of a dynamic vulcanized type without partial cross-linking.

8. A pad according to claim 2, wherein said styrenic TPE is of a dynamic vulcanized type without partial cross-linking.

9. A pad according to claim 1, wherein said skin layer is painted on its surface with coatings that enhance light fastness and wear resistance.

10. A pad according to claim 2, wherein said skin layer is painted on its surface with coatings that enhance light fastness and wear resistance.

11. A pad according to claim 1, wherein said styrenic TPE is selected from the group consisting of styrene butadiene styrene, styrene isoprene styrene, and styrene ethylene butadiene styrene.

12. A pad according to claim 2, wherein said styrenic TPE is selected from the group consisting of styrene butadiene styrene, styrene isoprene styrene, and styrene ethylene butadiene styrene.

13. A pad according to claim 1, wherein said olefine TPE is selected from the group consisting of a blend type, a homopolymer type, a copolymer type, their products from partial cross-linking with organic peroxide types and a dynamic vulcanized type which has the rubber phase completely cross-linked during mixing.

14. A pad according to claim 2, wherein said olefine TPE is selected from the group consisting of a blend type, a homopolymer type, a copolymer type, their products from partial cross-linking with organic peroxide types and a dynamic vulcanized type which has the rubber phase completely cross-linked during mixing.

15. A pad according to claim 1, wherein said core layer is selected from the group consisting of a polyester-polyether type wherein the hard segment is a polyester and the soft segment is a polyether and a polyester-polyester type wherein the hard segment is a polyester and the soft segment is an aliphatic polyester.

16. A pad according to claim 13 wherein said hard segment polyester is polybutylene terephthalate and said soft segment is an aliphatic polyester or a polyether selected from the group consisting of polytetramethylene glycol ether and the condensate of polytetramethylene glycol ether and terephthalic acid.

17. A pad according to claim 13 wherein said aliphatic polyester is polycaprolactane.

18. A pad according to claim 2, wherein said second resin material of polyurethane is a polyurethane selected from the group consisting of those based on caprolactone, adipate, polycarbonate, and polyester.

19. The pad according to claim 1, wherein said wear portion for expansion has been weakened by perforations, slits, or thinning the wall of the core layer.

20. The pad according to claim 2, wherein said wear portion for expansion has been weakened by perforations, slits, or thinning the wall of the core layer.

* * * * *